Jan. 24, 1961

J. S. FINGER 2,969,301

METHOD OF MAKING A SYNTHETIC RESIN
PANEL WITH A CRINKLED FINISH

Filed Jan. 24, 1955

INVENTOR.
Joseph S. Finger
BY
Nobbe & Swope
ATTORNEYS

Jan. 24, 1961   J. S. FINGER   2,969,301
METHOD OF MAKING A SYNTHETIC RESIN
PANEL WITH A CRINKLED FINISH
Filed Jan. 24, 1955   2 Sheets-Sheet 2
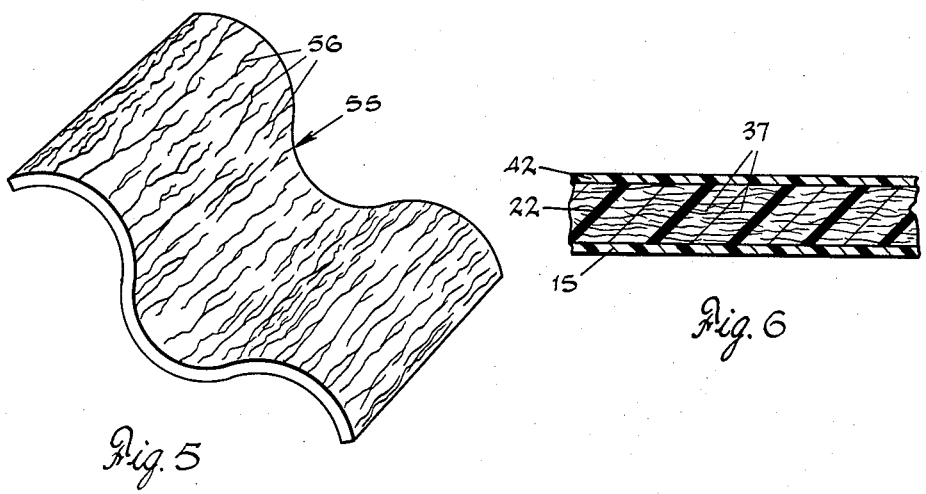
Fig. 5
Fig. 6
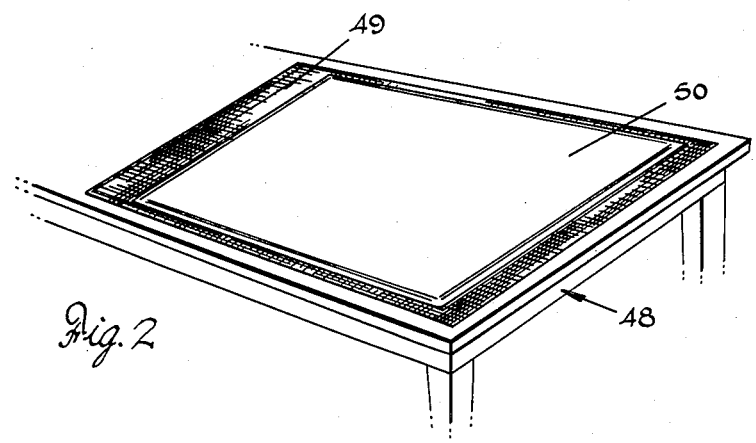
Fig. 2
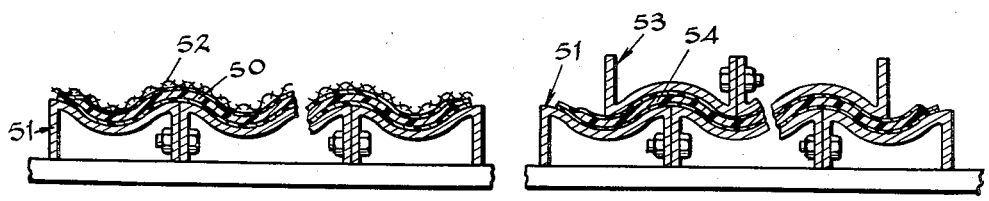
Fig. 3
Fig. 4
INVENTOR.
Joseph S. Finger
BY
Nobbe & Swope
ATTORNEYS United States Patent Office 2,969,301
Patented Jan. 24, 1961

2,969,301

METHOD OF MAKING A SYNTHETIC RESIN PANEL WITH A CRINKLED FINISH

Joseph S. Finger, Bellaire, Tex., assignor, by mesne assignments, to Johns-Manville Fiber Glass Inc., Cleveland, Ohio, a corporation of Delaware Filed Jan. 24, 1955, Ser. No. 483,771

3 Claims. (Cl. 154—106)

This invention relates broadly to synthetic resin articles of manufacture and to processes of making the same. More particularly, it relates to synthetic resin panels having surfaces provided with a decorative crinkled finish, and to processes of producing the same.

Various thermosetting resins such as the polyesters, the phenol-formaldehydes, and others can be combined with a suitable reinforcing material and spread upon a smooth surface and cured to form panels for various uses. Such uses include skylights in buildings, awnings, wall and ceiling panels and others.

One method now practiced in the art for manufacturing such panels, comprises placing a thin plastic film, such as regenerated cellulose (known in the trade as cellophane) upon a forming table. An interlayer comprising a thermosetting resin containing a suitable reinforcement such as chopped glass fibers is then positioned upon the cellulose film. A second film of cellulose is subsequently positioned upon the resin interlayer and carefully smoothed out, and the "sandwich" thus produced is subjected to a curing operation. Panels thus produced are characterized by having a substantially smooth surface finish.

The present invention is based on the discovery that by employing selected types of pliable films in the presence of controlled amounts of water during the curing operation, resin panels can be produced which have their surfaces formed into a highly decorative crinkled finish.

Accordingly, it is an object of the present invention to provide a method for forming a thermosetting resin product in which novel decorative effects can be produced on the surfaces thereof by solidifying crinkles into the surfaces.

It is a further object of this invention to provide a method for forming a thermosetting resin product wherein selected types of pliable films are employed in the presence of controlled quantities of water to encase the products during the curing stage to thereby provide decorative crinkled finishes on the surfaces.

It is a further object of the present invention to provide a novel thermosetting product having a unique decorative crinkle finish thereon, which product may be translucent and may be tinted with suitable dyes or pigments.

Other objects and advantages will become apparent as the description proceeds, particularly when reference is later made to the accompinying drawings.

In the drawings wherein like numerals are employed to designate like parts throughout the same:

Fig. 2 illustrates a table having a water absorptive web secured to the top thereof, as employed in the present invention;

Fig. 3 illustrates the lower half of a curing mold employed to support the wet resin lay-up during initial gelation of the thermosetting resin;

Fig. 4 illustrates the mold of Fig. 3 with the upper section in position as employed in the final cure of the thermosetting resin;

Fig. 5 is a perspective view of a reinforced plastic panel made according to the process of the present invention; and Fig. 6 is an enlarged sectional view illustrating the cross-section of a panel prior to curing by the present process.

Figure 1:
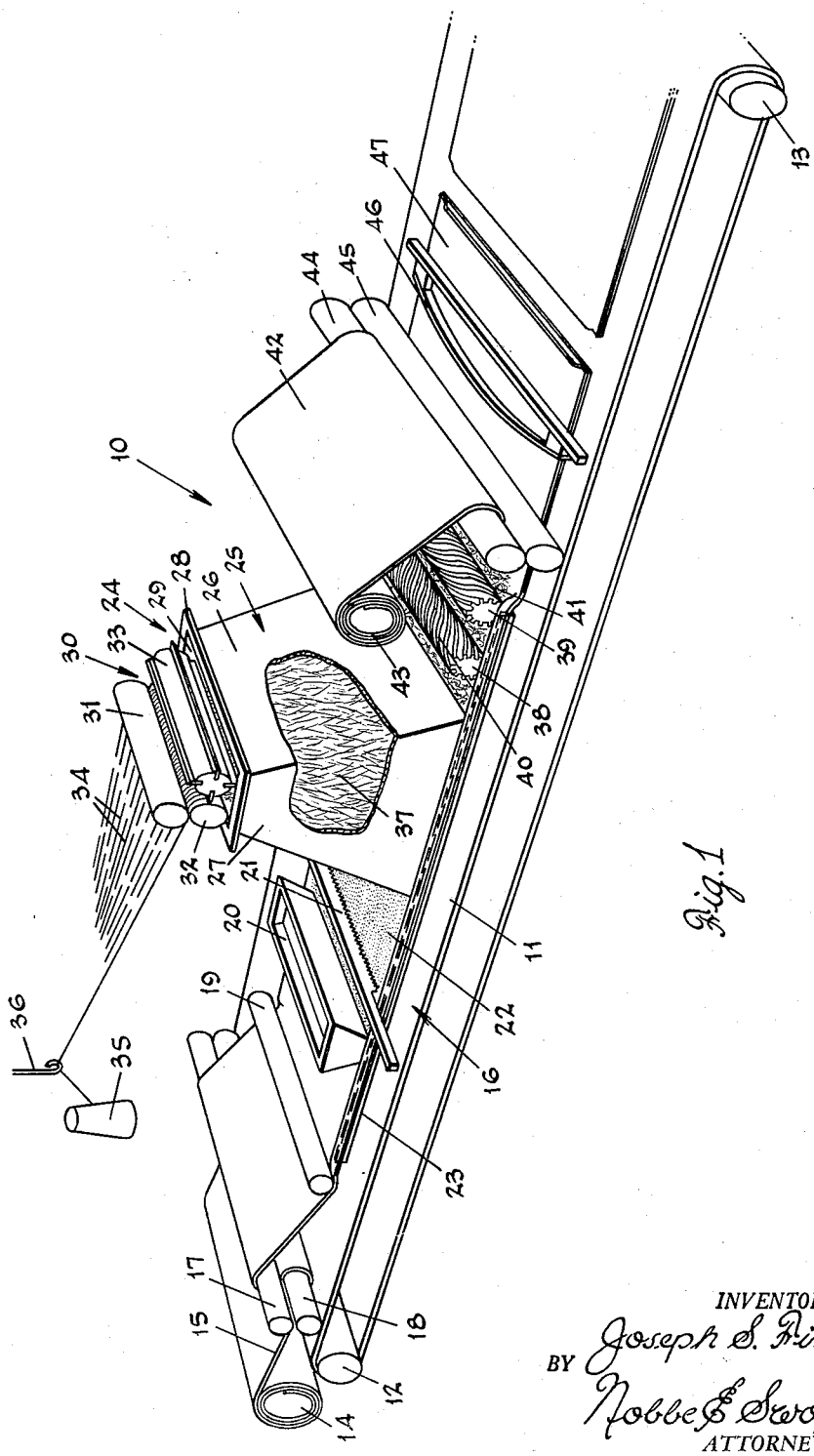
Fig. 1 is a diagrammatic illustration of a machine adapted to produce panels suitable for curing by the present process.

In accordance with the present invention, a layer of thermosetting resin in liquid form, is placed upon a pliable film which is capable of crinkling in the presence of water. A reinforcing filler is combined with the resin and a second film is placed on top of the resin and filler mixture. The film-encased assembly is thereafter rolled or squeegeed to remove entrapped bubbles of air and is positioned upon a moisture laden blanket or other suitable wet surface for a period of time sufficiently long to allow the film to crinkle. The wet resin lay-up is transferred to a suitable lower mold section and a moisture laden blanket is positioned upon the wet lay-up and the assembly is passed through a curing oven to effect initial gelation of the resin. During this stage of resin gelation, both films are maintained in a crinkled condition and the resin is caused to gel or initially set whereby the crinkles are solidified into its major surfaces. Thereafter the moisture laden blanket is removed and a thin cover sheet is substituted to minimize buckling or warpage of the panel during final resin cure. The assembly is next passed through a heated oven where the resin is caused to be fully cured to a hard, solid product. The panels are subsequently trimmed to exact size, and with the films stripped away, are ready for use.

As shown on the drawings, numeral 10 designates generally a machine for continuously producing reinforced synthetic resin panels by the wet lay up method. Machine 10 includes a continuous belt 11 suitably fabricated of reinforced rubber and movably mounted upon a pair of horizontally aligned and spaced rolls 12 and 13. At the left hand end of the machine 10 a roll 14 of cellulose acetate film is supported on an axis parallel to the axes of conveyor rolls 12 and 13 in a manner whereby the film 15 can be payed out and smoothly laid down upon the forward flight 16 of belt 11 in a continuous manner. The feeding mechanism for the film 15 includes a pair of vertically spaced rolls 17 and 18 mounted transversely of belt 11 and a third roll 19 similarly mounted and positioned forwardly of rolls 17 and 18. Roll 19 is in peripheral contact with flight 16 of belt 11. Film 15 is fed beneath roll 17, up and around roll 18 and then down beneath roll 19 and onto flight 16 of belt 11. A resin hopper 20 is positioned transversely of belt 11, in front of roll 19 and a short distance above flight 16 of belt 11. Resin hopper 20 comprises an elongated trough of a length equivalent to the width of belt 11 and is provided in its bottom with a series of spaced holes (not shown) through which a liquid thermosetting resin such as a polyester resin is flowed upon the film 15. A smooth and gauge comb 21 is positioned in front of hopper 20 and is adapted to spread the liquid resin evenly across film 15 and maintain a uniform layer 22 of resin moving forwardly. An elongated angle iron retainer 23 is positioned slightly above the edge of flight 16 of belt 11. A similar retainer member (not shown) is similarly positioned along the other edge of flight 16. The extreme edge of the film 15 rides on and is slightly elevated by retainer member 23 and with the other retainer member forms a shallow movable trough from film 15 for retaining the resin layer 22 on the belt 11.

A chopped fiber distributing unit 24 is positioned forwardly of roll 21 and is adapted to cut and uniformly distribute fibers upon and across the resin layer 22. Unit 24 includes an upstanding hood 25 having front and rear walls 26 of a width equal to the width of the resin layer 22. The side walls 27 taper upwardly in triangular fashion and converge to a horizontally disposed top plate 28 which is provided with an elongated opening 29. A cutter unit 30 is supported above the opening 29 and comprises a pair of peripherally engaging, vertically spaced feed rolls 31 and 32 and a rotatable knife carrier 33 adapted to engage the periphery of roll 32. A plurality of strands 34 are respectively fed from packages 35 through guides 36 and between the feed rolls 31 and 32, downwardly around roll 32 where they are cut into suitable lengths by the knife carrier 33. The chopped strands 37 fall through opening 29 and are spread over the resin layer 22. A pair of press rolls 38 and 39 are positioned forwardly of hood 25 and are provided respectively with left and right hand helical threads 40 and 41 which press the chopped strands 37 into the resin layer 22. Threads 40 and 41 of rolls 38 and 39 respectively force beads of resin back and forth across the resin layer 22, thoroughly wetting the chopped fibers 37 with resin and press the fibers into the liquid resin. Following the press rolls 38 and 39, the cover film 42 is applied. A roll 43 of sheet material such as the cellulose acetate film previously described, is supported above flight 16 and is adapted to be rotated and pay out the film 42 in a uniform and continuous manner on top of the resin layer 22. A pair of vertically spaced feed rolls 44 and 45, positioned forwardly of press rolls 38 and 39 aid in feeding the film 42. Rolls 44 and 45 are positioned transversely of belt 11 and roll 45 peripherally contacts flight 16. Roll 44 is positioned above roll 45 and is in peripheral contact therewith. Film 42 is fed around and under roll 44 and then half laps roll 45 in a reverse manner and is thereby laid upon the resin layer 22. An arcuately shaped squeegee 46 is positioned forwardly of rolls 44 and 45 and is adapted to press and smooth out film 42 and thereby aids in the removal of bubbles of air which may have become entrained in the resin layer 22.

Machine 10 is thus adapted to continuously produce a wet resin lay up 47 having a chopped strand reinforcement 37 incorporated therein.

As shown in Fig. 2 there is a table 48 of conventional construction having a layer of burlap 49 secured to the top thereof and stretched taut and smooth. The burlap 49 is kept moist with water and a panel 50, cut from the wet lay up 47 is placed on the wet burlap to moisten the bottom film 15. After being in position upon the burlap 49 for a suitable time, usually 15 to 60 seconds, the lower film 15 becomes moistened and quickly becomes uniformly crinkled. The panel 50 is then immediately transferred to a lower mold 51, shown in Fig. 3 as a corrugated structure, and a layer of wet burlap 52 is positioned on top of the panel to moisten the upper film 42 and thereby cause crinkling thereof. Mold 51 with the panel 50 and cover burlap 52 in position is placed in a heated oven (not shown) to get the resin to the "B" stage, i.e., the resin is set to a firm state. The mold 51, and panel 50 and burlap 49 are then removed from the oven.

As shown in Fig. 4 the burlap 52 has been removed and replaced by upper mold section 53 to restrain the panel 50 from buckling during the final or "C" stage cure. The lower mold 51, "B" stage panel 54 and upper mold 53 are then placed in an oven (not shown) where the resin is cured to the "C" stage, or its final stage of hardness and rigidity. When cure is complete, the assembly is removed from the oven, and the panels are trimmed to exact size and the cover films are removed. A finished panel 55 with the cover films stripped away is shown in Fig. 5. Number 56 indicates the crinkles in the surface of the resin layer 22.

As an alternate procedure, the wet resin lay up may have each of its cover films lightly sprayed with water in lieu of being subjected to the above-described moisture treatment. After such water spray, the panel is transferred to a lower mold and a cover sheet is immediately applied to retain the moisture content of the films while the resin is gelled by application of heat.

Where it is desirable to impart a crinkled finish to only one surface of a panel, only one of the films need be treated to provide a crinkle. Of course, when so operating, a non-moisture reactive film can be used on the surface where no crinkle is desired.

Films applicable to use in the present process include those which are capable of crinkling uniformly in the presence of water. The preferred film is that made from cellulose acetate. Films of a thickness of 0.05 inch or less can be employed satisfactorily in the present invention. Generally films of a thickness in the range from 0.0002 to 0.0025 inch are employed for economy of operation.

The thermosetting resin employed may include any of the various thermosetting materials such as polyester resins, polystyrene-polyester blends, phenol-formaldehyde, urea-formaldehyde, melamine-formaldehyde, alkyds and the like.

Fillers of various materials can be employed to reinforce the synthetic resin and add strength and rigidity to the finished products. Such fillers include fiber glass in felted or woven form, sheets of cotton or wool fabrics, canvas, duck, muslin, linen, rayon, nylon, and the like as well as asbestos, cotton batting, etc. All of the fillers can be used in shredded form and dropped into the resin in random fashion to provide an interlaced mat of continuous character.

Gelling temperatures in the range from about 80° F. to 250° F. may be employed in the present process with temperatures in the range from 100° F. to 200° F. being preferred. Accordingly it will generally be desirable to add a suitable catalyst to the resin material which will enable the resin to be gelled within this temperature range. By so operating, the moisture layer will be preserved during the gelling operation. After the resin has been gelled to a solid state, the final curing can be effected at more elevated temperatures as is well known in the art.

Catalysts which can be employed in curing the resin include benzoyl peroxide, tertiary butyl perbenzoate, methylethylketone peroxide and the like.

If desired, very low pressures may be employed during the gelling and curing operations. Generally pressures of less than 2 pounds per square inch will be satisfactory to the production of shapes such as corrugations and the like. The pressure must however be maintained at a level low enough not to restrict the crinkling action of the pliable film in the presence of moisture.

The products may be tinted with dyes or pigments of the relatively light-fast type which are not effected by the other components of the resin formulation when it is desired to produce colored products.

*Example I*

In a production run, a film of cellulose acetate of 0.0015 inch thickness was laid down on a continuous conveyor belt. The film was manufactured by the Celanese Corporation of America and was designated commercially as P–904. A layer of polyester-styrene blend having a catalyst incorporated therein was then flowed onto the cellulose acetate film in a uniform layer approximately 3/32 of an inch in thickness. Chopped glass fibers were then dropped onto the resin layer in random fashion to form a felted mat, and a roller was employed to press the fibers into the resin. A second film of cellulose acetate was applied over the resin layer and the wet lay up so formed was squeegeed to remove occluded air and was cut into appropriately shaped sections. The cut sections were placed upon a table covered with a layer of wet burlap. Within seconds the lower film of cellulose acetate contacting the wet burlap had crinkled. The wet lay up was then transferred to a corrugated aluminum mold and was pressed into conformity with the corrugations. A layer of wet burlap was laid upon the lay up and the assembly was passed through a "first-stage" oven where infrared heat was applied to the assembly to gel the resin. At this ponit the crinkles of the films had become permanently formed into the resin surfaces. The assembly was removed from the oven and the burlap was replaced with a light weight aluminum cover or "caul" sheet of a configuration mating with that of the mold. The cover sheet exerted approximately 0.1 pound per square inch of pressure upon the gelled lay up. The assembly was then passed through a second oven where the resin was completely cured to a hard, solid mass. After the curing operation was completed, the cellulose acetate films were stripped from the resin to disclose a highly decorative crinkled finish on each of the major surfaces of the panel.

As used herein and in the claims the word "crinkle" may be defined as resin-rich elevations of an amplitude of .003" or more, substantially uniformly distributed in a random pattern over the entire surface so that the area of said elevations comprises more than 10% of the surface.

The invention herein disclosed is particularly adapted for use in connection with the production of reinforced thermosetting resin panels for use as structural materials, and accordingly, examples of this invention for the purpose of disclosure are directed toward that adaptation.

It is to be understood that the foregoing detailed description is given merely by way of illustration for the purpose of the disclosure and that many variations may be made therein without departing from the spirit of the invention and the scope of the subjoined claims.

I claim:

1. A method of producing a fiber reinforced thermosetting resin product having a highly decorative resin rich crinkled finish, comprising depositing a layer of a liquid thermosetting resin on a thin plastic film, depositing reinforcing fibers upon the surface of said layer of liquid resin and submerging said fibers in the resin, applying a thin plastic film onto the surface of the reinforced layer of resin after the fibers are submerged to form a resin-film laminate, at least one of said films being capable of crinkling in the presence of moisture, moistening the film capable of crinkling in the presence of moisture, and while said film is still moist heating the laminate to commence the cure of the resin.

2. A method of producing a fiber reinforced thermosetting resin product having a highly decorative resin rich crinkled finish as defined in claim 1, wherein the film is moistened by placing a wet surface thereagainst, and the resin-film laminate is simultaneously heated and shaped while held immovable while in contact with a molding member while the wet surface is maintained in contact with said moistened film.

3. A method of producing a fiber reinforced thermosetting resin product having a highly decorative resin rich crinkled finish as defined in claim 2, wherein the resin-film laminate is heated to a gel stage while in contact with said molding member, and after being heated to a gel stage the wet surface is removed from contact with the laminate after which said laminate is finally cured between a pair of molding members.

References Cited in the file of this patent

UNITED STATES PATENTS

| | | |
|---|---|---|
| 2,133,183 | Baird et al. | Oct. 11, 1938 |
| 2,410,361 | Prance | Oct. 29, 1946 |
| 2,500,728 | Williams | Mar. 14, 1950 |
| 2,510,967 | Flanagan | June 13, 1950 |
| 2,536,048 | Flanagan | Jan. 2, 1951 |
| 2,595,734 | Toulmin | May 6, 1952 |
| 2,784,763 | Shorts | Mar. 12, 1957 |

FOREIGN PATENTS

| | | |
|---|---|---|
| 13,072 | Great Britain | Apr. 29, 1915 |